(12) United States Patent
Kim et al.

(10) Patent No.: US 8,129,049 B2
(45) Date of Patent: Mar. 6, 2012

(54) JELLY-ROLL HAVING ACTIVE MATERIAL LAYER WITH DIFFERENT LOADING AMOUNT

(75) Inventors: Jong Hee Kim, Daejeon (KR); Dongmyung Kim, Daejeon (KR); Hyungook Yoon, Cheongju-Si (KR); Yong Jeong Kim, Daejeon (KR); Joo-Hwan Sung, Daejeon (KR); Seung W. Chu, Daejeon (KR); Sung-Pil Yoon, Daejeon (KR); Dohyun Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 199 days.

(21) Appl. No.: 12/532,687

(22) PCT Filed: Mar. 24, 2008

(86) PCT No.: PCT/KR2008/001655
§ 371 (c)(1),
(2), (4) Date: Dec. 11, 2009

(87) PCT Pub. No.: WO2008/117974
PCT Pub. Date: Oct. 2, 2008

(65) Prior Publication Data
US 2010/0104930 A1 Apr. 29, 2010

(30) Foreign Application Priority Data
Mar. 26, 2007 (KR) .................. 10-2007-0028967

(51) Int. Cl.
*H01M 4/00* (2006.01)
*H01M 4/13* (2010.01)
*H01M 6/48* (2006.01)
*H01M 10/18* (2006.01)

(52) U.S. Cl. .................. 429/210; 429/94
(58) Field of Classification Search .............. 429/94, 429/210
See application file for complete search history.

(56) References Cited

U.S. PATENT DOCUMENTS

| 6,630,270 | B1 | 10/2003 | Kim et al. |
| 2004/0126663 | A1 | 7/2004 | Sudano et al. |
| 2006/0222934 | A1 | 10/2006 | Min et al. |

FOREIGN PATENT DOCUMENTS

| EP | 0704921 A1 * | 4/1996 |
| JP | 8-130035 A | 5/1996 |
| JP | 2006-12703 A | 1/2006 |
| JP | 2006-269424 A | 10/2006 |
| KR | 10-2000-0042088 A | 7/2000 |
| KR | 10-2004-0089519 A | 10/2004 |
| KR | 10-2005-0121512 A | 12/2005 |

* cited by examiner

*Primary Examiner* — Gregg Cantelmo
*Assistant Examiner* — Eugenia Wang
(74) *Attorney, Agent, or Firm* — Birch, Stewart, Kolasch & Birch, LLP

(57) ABSTRACT

Disclosed herein is a jelly-roll type electrode assembly ("jelly-roll") of a cathode/separator/anode structure, wherein the jelly-roll is constructed in a structure in which each electrode has active material layers formed on opposite major surfaces of a sheet-type current collector, the loading amount of an active material for the inner active material layer, constituting the inner surface of each sheet when each sheet is wound, is less than that of an active material for the outer active material layer, constituting the outer surface of each sheet when each sheet is wound, and the loading amount of the active material for the inner active material layer gradually increases from the central region of each wound sheet to the outermost region of each wound sheet.

8 Claims, 2 Drawing Sheets

JELLY-ROLL HAVING ACTIVE MATERIAL LAYER WITH DIFFERENT LOADING AMOUNT

FIELD OF THE INVENTION

The present invention relates to a jelly-roll including active material layers having different loading amounts of an active material, and, more particularly, to a jelly-roll type electrode assembly ("jelly-roll") of a cathode/separator/anode structure, wherein the jelly-roll is constructed in a structure in which each electrode has active material layers formed on opposite major surfaces of a sheet-type current collector, the loading amount of an active material for the inner active material layer, constituting the inner surface of each sheet when each sheet is wound, is less than that of an active material for the outer active material layer, constituting the outer surface of each sheet when each sheet is wound, and the loading amount of the active material for the inner active material layer gradually increases from the central region of each wound sheet to the outermost region of each wound sheet.

BACKGROUND OF THE INVENTION

As mobile devices have been increasingly developed, and the demand of such mobile devices has increased, the demand for batteries has also sharply increased as an energy source for the mobile devices. Also, much research on secondary batteries satisfying various needs has been carried out.

A secondary battery is constructed in a structure in which a chargeable and dischargeable electrode assembly of a cathode/separator/anode structure is mounted in a battery case. A representative example of the electrode assembly is a jelly-roll type electrode assembly.

A jelly-roll type assembly (or a 'jelly-roll') is manufactured by applying, drying, and pressing electrode active materials to opposite major surfaces of metal sheets, which are used as current collectors, cutting into the shape of a band having a predetermined width and length, and winding the metal sheets, serving as an anode and a cathode, while disposing a separator between the anode and the cathode, in a helical shape.

During the manufacture of the jelly-roll, however, the radius of curvature of the inner sheet is small at the central region of the jelly-roll, with the result that the active material applied toward the inner surface side of the jelly roll is pressurized, during the winding of the sheets, and therefore, the active material lumps or the density of the active material greatly increases. Due to the nonuniform distribution of the active material, the active material layers inside and outside each current collector have different electrochemical reaction amounts, with the result that jelly-roll twist occurs, and therefore, the service life of the battery decreases.

In a lithium secondary battery, which is a representative example of secondary batteries, some electrolyte containing lithium salt is decomposed through side reaction, during the repetitive charge and discharge of the secondary battery, with the result that the amount of the electrolyte gradually decreases.

When the battery is overcharged with a voltage of approximately 4.5 V or more, for example, a cathode active material is decomposed, lithium metal grows at an anode in the shape of a dendrite, and an electrolyte is decomposed. At this time, heat is generated, and therefore, the above-described decomposition process and several side reactions rapidly progress, with the result that the electrolyte is consumed. This phenomenon is more accelerated at the inside active material layer of the jelly-roll where the electrochemical reaction is more active. Also, the nonuniform consumption of the electrolyte at the outside region and the inside region of the jelly-roll causes the jelly-roll twist.

In connection with this matter, Korean Patent Application Publication No. 2004-089519 discloses a technology for maintaining the capacity ratio of an active material layer formed inside an anode sheet of a jelly-roll to an active material layer formed outside the anode sheet of the jelly-roll 0.6 to 0.8 to prevent current collectors from being cut and wrinkle. According to the disclosed technology, the amount of active material on the inner surface of the wound jelly-roll is less at the central region of the jelly-roll, where the radius of curvature is small, than at the outermost region of the jelly-roll, and therefore, winding of the sheet is easy, and the wrinkles preventing effect is excellent.

However, the inventors of the present invention have found that the easy winding and wrinkles preventing effect, which are effects acquired by the capacity ratio between the active material layers, are lowered due to the increase in radius of curvature as the outermost region of the jelly-roll is reached; rather, the capacity of the battery is decreased, and the service life of the battery is reduced, due to unbalance of the active material layers at the outer and inner surfaces of the wound jelly-roll.

Consequently, there is a high necessity for a technology that is capable of fundamentally solving the above-mentioned problems.

SUMMARY OF THE INVENTION

Therefore, the present invention has been made to solve the above-mentioned problems, and other technical problems that have yet to be resolved.

As a result of a variety of extensive and intensive studies and experiments to solve the problems as described above, the inventors of the present invention have found that, when a jelly-roll is improved in a structure in which the jelly-roll has active material layers having different loading amounts of an active material according to a specific condition, which will be described hereinafter in detail, an electrolyte in a battery case is uniformly consumed, whereby the occurrence of jelly-roll twist is prevented, and the ratio of loading amount of the active material between a region outside a current collector and a region inside the current collector is uniformly maintained, whereby the capacity and service life of a battery are greatly improved. The present invention has been completed based on these findings.

In accordance with one aspect of the present invention, the above and other objects can be accomplished by the provision of a jelly-roll type electrode assembly ("jelly-roll") of a cathode/separator/anode structure, wherein the jelly-roll is constructed in a structure in which each electrode has active material layers formed on opposite major surfaces of a sheet-type current collector, the loading amount of an active material for the inner active material layer, constituting the inner surface of each sheet when each sheet is wound, is less than that of an active material for the outer active material layer, constituting the outer surface of each sheet when each sheet is wound, and the loading amount of the active material for the inner active material layer gradually increases from the central region of each wound sheet to the outermost region of each wound sheet.

Specifically, in the jelly-roll according to the present invention, the active material layers are formed on the opposite major surfaces of the sheet-type current collector such that the loading amount of the active material for the inner active material layer of the jelly-roll is less than that of the active material for the outer active material layer of the jelly-roll, thereby preventing the inner active material layer from lumping or the density of the active material layer from increasing due to pressure applied to the inner active material layer at the central region of the jelly-roll where the radius of curvature is small Also, the radius of curvature increases as the outermost region of the jelly-roll is reached, with the result that the above-described phenomenon in which the pressure or density increases gradually reduces. In the structure in which the loading amount of the active material for the inner active material layer gradually increases from the central region to the outermost region, as described above, it is easy to wind the sheets, and it is possible to uniformly maintain the ratio of the loading amount of the active material between the outer and inner regions, thereby greatly improving the capacity and service life of a battery.

Furthermore, the loading amount of the active material for the inner active material layer where electrochemical reaction is more active is relatively small, with the result that the electrolyte is approximately equally consumed due to the uniform electrochemical reaction between the inner active material layer and the outer active material layer, thereby preventing the occurrence of jelly-roll twist.

In the present invention, the term 'inner' means a side facing the central region of the current collector having active material layers formed on opposite major surfaces thereof, and the term 'outer' means a side facing the outermost region of the current collector having active material layers formed on opposite major surfaces thereof. Also, the term 'the central region' means one end of the current collector where the winding is commenced, i.e., the center of the wound current collector, and the term 'the outermost region' means the other end of the current collector where the winding is terminated, i.e., the outer circumference of the wound current collector.

According to the present invention, therefore, the loading amount of the active material for the inner active material layer is less than that of the active material for the outer active material layer, and the loading amount of the active material for the outer active material layer is uniform, whereas the loading amount of the active material for the inner active material layer gradually increases from the central region to the outermost region. However, the loading amount of the active material for the inner active material layer at the winding termination end, where the loading amount of the active material is the largest, is still less than that of the active material for the outer active material layer.

In a preferred embodiment, the inner and outer active material layers have the same density, and the difference of the loading amount of the active material between the inner and outer active material layers is based on the difference in thickness between the inner and outer active material layers. This is because, when the inner and outer active material layers have different densities, the manufacturing process is complicated, and, during the winding process, stress may concentrate at the active material layer having a relative high density.

The loading amount of the active material for the inner active material layer may be within the range of 40 to 95% of that of the active material for the outer active material layer. This is because, if the loading amount of the active material for the inner active material layer is too small, electrochemical reactivity greatly decreases, and, on the other hand, if the loading amount of the active material for the inner active material layer is too large, the effect achieved according to the present invention becomes insignificant. More preferably, the loading amount of the active material for the inner active material layer is within the range of 50 to 85% of that of the active material for the outer active material layer.

Also, the loading amount of the active material for the inner active material layer may increase from the central region of each wound sheet to the outermost region of each wound sheet such that the loading amount of the active material for the inner active material layer at the inner end of each sheet is 30 to 80% of that of the active material for the inner active material layer at the outer end of each sheet. If the loading amount of the active material for the inner active material layer at the inner end of each sheet is too small, electrochemical reactivity greatly decreases, and, on the other hand, if the loading amount of the active material for the inner active material layer at the inner end of each sheet is too large, the effect achieved according to the present invention becomes insignificant. More preferably, the loading amount of the active material for the inner active material layer increases from the central region of each wound sheet to the outermost region of each wound sheet such that the loading amount of the active material for the inner active material layer at the inner end of each sheet is 40 to 75% of that of the active material for the inner active material layer at the outer end of each sheet.

The jelly-roll is preferably manufactured by winding a cathode sheet and an anode sheet having active material layers formed thereon, while disposing a separator between the cathode sheet and the anode sheet, in a helical shape and compressing the wound sheets into a shape in which the wound sheets can be received in a prismatic case.

In accordance with another aspect of the present invention, there is provided a secondary battery including the above-described jelly-roll.

Generally, the jelly-roll is used for a cylindrical battery manufactured by mounting the jelly-roll in a cylindrical container or for a prismatic battery manufactured by compressing the wound jelly-roll into a prismatic shape and mounting the prismatic jelly-roll in a prismatic battery case.

Preferably, the secondary battery is a prismatic battery constructed in a structure in which the jelly-roll is mounted in the prismatic battery case. The prismatic battery may be manufactured by mounting the jelly-roll in the prismatic battery case, coupling a top cap having a protruding anode terminal to the open upper end of the battery case, and injecting an electrolyte into the battery case through an electrolyte injection port formed at the top cap.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
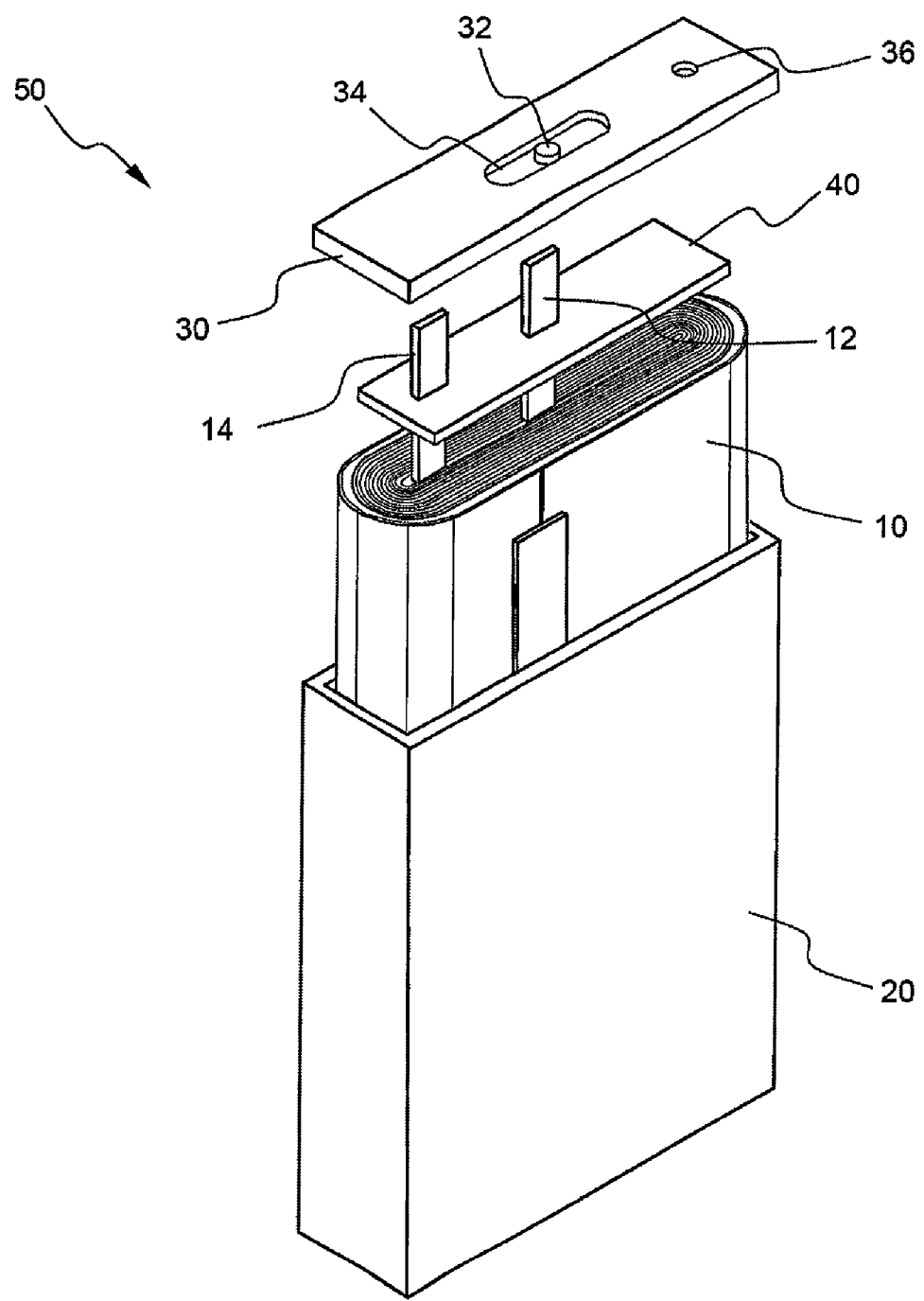
FIG. 1 is an exploded perspective view illustrating a prismatic battery having a jelly-roll mounted therein.

FIG. 1 is an exploded perspective view typically illustrating a prismatic battery having a jelly-roll mounted therein.

Referring to FIG. 1, a prismatic battery 50 is constructed in a structure in which a jelly-roll type electrode assembly 10 is mounted in a prismatic metal case 20, a top cap 30 having a protruding electrode terminal (for example, an anode terminal) 32 is coupled to the open upper end of the case 20.

An anode of the electrode assembly 10 is electrically connected to the lower end of the anode terminal 32 on the top cap 30 via an anode tab 12. The anode terminal 32 is insulated from the top cap 30 by an insulation member 34. On the other hand, the other electrode (for example, a cathode) of the electrode assembly 10 is electrically connected to the top cap 30, which is made of a conductive material, such as aluminum or stainless steel, via a cathode tab 14. Consequently, the cathode tab 14 serves as a cathode terminal.

In order to secure electrical insulation between the electrode assembly 10 and the top cap 30, excluding the electrode tabs 12 and 14, a sheet-type insulation member 40 is disposed between the prismatic case 20 and the electrode assembly 10, the top cap 30 is put on the prismatic case 20, and welding is carried out along the contact interface between the top cap 30 and the prismatic case 20 to couple the top cap 30 and the prismatic case 20 to each other. Subsequently, an electrolyte is injected into the prismatic case 20 through an electrolyte injection port 36, the electrolyte injection port 36 is welded in a sealed state, and then epoxy is applied to the welded region. As a result, a battery is manufactured.

Figure 2:
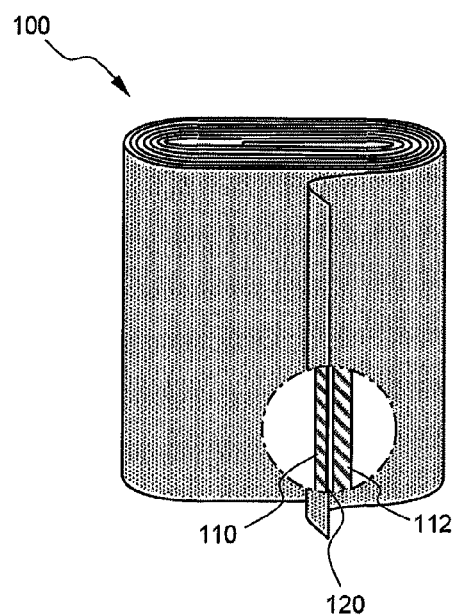
FIG. 2 is a typical view illustrating a jelly-roll including active material layers having different loading amounts of an active material according to a preferred embodiment of the present invention.

FIG. 2 is a typical view illustrating a jelly-roll including active material layers having different loading amounts of an active material according to a preferred embodiment of the present invention.

Referring to FIG. 2, a jelly-roll 100 is manufactured by winding a metal sheet 120 having active material layers 110 and 112 formed on the inner and outer surfaces thereof in a helical shape and compressing the wound metal sheet 120 flat, i.e., into a shape in which the wound metal sheet 120 can be received in the prismatic case 20 (see FIG. 1). The active material layers 110 and 112 are formed on the opposite major surfaces of the metal sheet 120. The two active material layers 110 and 112 are constructed such that the loading amount of an active material for the inner active material layer 110, constituting the inner surface of the metal sheet 120 when the metal sheet 120, on the opposite major surfaces of which active material layers 110 and 112 are formed, is wound, is less than that of an active material for the outer active material layer 112, constituting the outer surface of the metal sheet 120 when the metal sheet 120, on the opposite major surfaces of which active material layers 110 and 112 are formed, is wound.

Consequently, during the winding of the metal sheet 120, the thickness of the inner active material layer 110, which has a relatively small diameter, is less than that of the outer active material layer 112. As a result, it is possible to minimize a phenomenon in which the density of the inner active material layer 110 increases or the inner active material layer 110 lumps due to pressure applied to the inner active material layer 110 during the winding of the metal sheet 120. Furthermore, the loading amount of the active material for the inner active material layer 110 is small, and therefore, electrolyte consumption decreases. Consequently, it is possible to uniformly adjust the electrolyte consumption ratio between the inner active material layer 110 and the outer active material layer 112.

Figure 3:
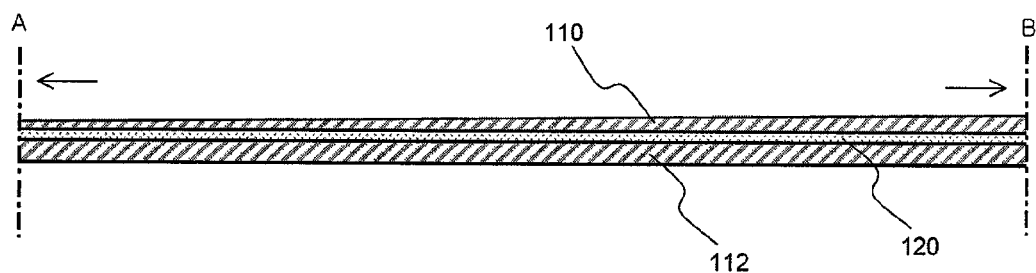
FIG. 3 is a sectional typical view illustrating a metal sheet having active material layers formed thereon before the jelly-roll of FIG. 2 is wound.

FIG. 3 is a sectional typical view illustrating a metal sheet having active material layers formed thereon before the jelly-roll of FIG. 2 is wound.

Referring to FIG. 3, an active material is applied to the opposite major surfaces of the metal sheet 120 such that the inner active material layer 110 and the outer active material layer 112 are formed on the opposite major surfaces of the metal sheet 120. The metal sheet 120 is constructed in a structure in which, when the metal sheet 120 is wound, the loading amount of the active material for the inner active material layer 110 gradually increases from the central region A of the wound sheet to the outermost region B of the wound sheet.

This structure achieves easy winding of the metal sheet 120 and fundamentally prevents the active material from lumping or the density of the active material from greatly increasing even when pressure due to small radius of curvature is applied toward the central region A of the wound sheet.

Hereinafter, examples of the present invention will be described in more detail. It should be noted, however, that the scope of the present invention is not limited by the illustrated examples.

EXAMPLE 1

A cathode mixture slurry was prepared by adding 95 weight percent of $LiCoO_2$ as a cathode active material, 2.5 weight percent of Super-P as a conducting agent, and 2.5 weight percent of PVdf as a binder to N-methyl-2-pyrrolidone (NMP) as a solvent. An anode mixture slurry was prepared by adding 94 weight percent of artificial graphite as an anode active material, 1.5 weight percent of Super-P as a conducting agent, and 4.5 weight percent of PVdf as a binder to NMP as a solvent. The cathode mixture slurry and the anode mixture slurry were coated on an aluminum sheet and a copper sheet, respectively. Subsequently, the aluminum sheet and the copper sheet were dried and pressed. In this way, a cathode and an anode were manufactured.

Subsequently, the cathode and the anode were wound, while a porous separator (Cell Guard™) was disposed between the cathode and the anode, to manufacture a jelly-roll type electrode assembly.

At this time, the cathode mixture slurry and the anode mixture slurry were coated, dried, and pressed on the opposite major surfaces of the aluminum sheet and the copper sheet, respectively, such that active material layers were formed on the opposite major surfaces of the aluminum sheet and the copper sheet. And the jelly-roll type electrode assembly was manufactured in a structure in which, the loading amount of the active material for the inner active material layer, constituting the inner surface of each sheet when the aluminum sheet and the copper sheet were wound, was less than that of the active material for the outer active material layer, constituting the outer surface of each sheet when the aluminum sheet and the copper sheet were wound. Specifically, the loading amount of the active material for the inner active material layer, constituting the inner surface of each sheet, was approximately 80% of that of the active material for the outer active material layer, constituting the outer surface of each sheet. Also, the loading amount of the active material for the inner active material layer was gradually increased from the central region of each wound sheet to the outermost region of each wound sheet such that the loading amount of the active material for the inner active material layer at the inner end of each sheet corresponding to the central region of each wound sheet was approximately 65% of that of the active material for the inner active material layer at the outer end of each sheet corresponding to the outermost region of each wound sheet.

Subsequently, the manufactured jelly-roll type electrode assembly was mounted in a prismatic battery case, a top cap was coupled to the prismatic battery case, an electrolyte was injected into the battery case through an electrolyte injection port, and the electrolyte injection port was sealed, whereby a prismatic secondary battery was finally completed.

EXAMPLE 2

A prismatic secondary battery was manufactured in the same manner as Example 1 except that the loading amount of the active material for the inner active material layer, constituting the inner surface of each sheet, was approximately 75% of that of the active material for the outer active material layer, constituting the outer surface of each sheet, and the loading amount of the active material for the inner active material layer was gradually increased from the central region of each wound sheet to the outermost region of each wound sheet such that the loading amount of the active material for the inner active material layer at the inner end of each sheet corresponding to the central region of each wound sheet was approximately 55% of that of the active material for the inner active material layer at the outer end of each sheet corresponding to the outermost region of each wound sheet, to manufacture a jelly-roll type electrode assembly.

COMPARATIVE EXAMPLE 1

A prismatic secondary battery was manufactured in the same manner as Example 1 except that the loading amount of the active material for the inner active material layer, constituting the inner surface of each sheet, was wholly equalized to that of the active material for the outer active material layer, constituting the outer surface of each sheet, and the loading amount of the active material for the outer and inner active material layers were uniformed from the central region of each wound sheet to the outermost region of each wound sheet such that the loading amount of the active material for the outer and inner active material layers at the inner end of each sheet corresponding to the central region of each wound sheet was equal to that of the active material for outer and inner active material layers at the outer end of each sheet corresponding to the outermost region of each wound sheet, to manufacture a jelly-roll type electrode assembly.

COMPARATIVE EXAMPLE 2

A prismatic secondary battery was manufactured in the same manner as Example 1 except that the loading amount of the active material for the inner active material layer, constituting the inner surface of each sheet, was approximately 70% of that of the active material for the outer active material layer, constituting the outer surface of each sheet, and the loading amount of the active material for the outer and inner active material layers were uniformed from the central region of each wound sheet to the outermost region of each wound sheet such that the loading amount of the active material for the outer and inner active material layers at the inner end of each sheet corresponding to the central region of each wound sheet was equal to that of the active material for outer and inner active material layers at the outer end of each sheet corresponding to the outermost region of each wound sheet, to manufacture a jelly-roll type electrode assembly.

COMPARATIVE EXAMPLE 3

A prismatic secondary battery was manufactured in the same manner as Example 1 except that the loading amount of the active material for the inner active material layer, constituting the inner surface of each sheet, was wholly equalized to that of the active material for the outer active material layer, constituting the outer surface of each sheet, and the loading amount of the active material for the inner active material layer was gradually increased from the central region of each wound sheet to the outermost region of each wound sheet such that the loading amount of the active material for the inner active material layer at the inner end of each sheet corresponding to the central region of each wound sheet was approximately 50% of that of the active material for the inner active material layer at the outer end of each sheet corresponding to the outermost region of each wound sheet, to manufacture a jelly-roll type electrode assembly.

EXPERIMENTAL EXAMPLE 1

30 batteries were manufactured according to Examples 1 and 2 and Comparative examples 1 to 3. The batteries were charged and discharged at a temperature of 50° C. in a voltage range of 3.0 V to 4.3 V for one cycle, and were then repeatedly charged and discharged in a voltage range of 3.4 V to 4.3 V for 300 cycles. Discharge capacities of the batteries at the time of charging and discharging the batteries in a first cycle in a voltage range of 3.4 V to 4.3 V was set to be initial capacities of the batteries, capacities of the batteries at the time of charging and discharging the batteries in a 300-th cycle was set to be remaining capacities of the batteries, and the mean value of ratios of the remaining capacities to the initial capacities was calculated. After the completion of the experiments, the batteries were exploded to confirm the number of batteries in which short circuits occurred between the jelly-roll and the battery case (the prismatic container) or the electrode leads by serious jelly-roll twist. The results are indicated in Table 1 below.

TABLE 1

|  | Number of short-circuited batteries | Ratio of remaining capacity to initial capacity (%) |
| --- | --- | --- |
| Example 1 | 0 | 91.7 |
| Example 2 | 0 | 90.2 |
| Comparative example 1 | 6 | 80.6 |
| Comparative example 2 | 2 | 84.1 |
| Comparative example 3 | 3 | 84.7 |

It can be seen from Table 1 above that the batteries manufactured according to Examples 1 and 2 exhibited higher safety and cycle characteristics than the batteries manufactured according to Comparative examples 1 to 3. It can also be seen that the batteries manufactured according to Comparative examples 2 and 3 exhibited higher safety and cycle characteristics than the batteries manufactured according to Comparative example 1; however, the safety and cycle characteristics of the batteries manufactured according to Comparative examples 1 and 2 were greatly lowered than those of the batteries manufactured according to Examples 1 and 2.

When the batteries were exploded, after the completion of the experiments, and the states of the jelly-rolls were observed, it was confirmed that jelly-rolls were twisted, and wrinkles occurred at the central regions of the wound sheets, for a plurality of batteries, among the batteries manufactured according to Comparative examples 1 to 3. On the other hand, it was confirmed that the jelly-roll twist and occurrence of wrinkles were considerably low for the batteries manufactured according to Examples 1 and 2.

INDUSTRIAL APPLICABILITY

As apparent from the above description, a jelly-roll including active material layers having different loading amounts of an active material according to the present invention uniformly consumes an electrolyte in a battery case. Consequently, the present invention has the effect of preventing the occurrence of jelly-roll twist. Furthermore, the ratio of loading amount of the active material between outer and inner regions is uniformly maintained. Consequently, the present invention has the effect of greatly improving the capacity and service life of a battery.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A jelly-roll of a cathode/separator/anode structure, wherein the jelly-roll is constructed in a structure in which the cathode and the anode have active material layers formed on opposite major surfaces of a sheet current collector, a loading amount of an active material for an inner active material layer, constituting an inner surface of the sheet current collector when the sheet current collector is wound, is less than that of an active material for an outer active material layer, constituting an outer surface of the sheet current collector when the sheet current collector is wound, and a loading amount of the active material for the outer active material layer is uniform, whereas the loading amount of the active material for the inner active material layer gradually increases from a central region of the sheet current collector to an outermost region of the sheet current collector, and the loading amount of the active material for the inner active material layer at a winding termination end, where the loading amount of the inner active material is largest, is less than that of the active material for the outer active material layer, and wherein the inner and outer active material layers have the same density, and a difference of the loading amount of the active material between the inner and outer active material layers is based on a difference in thickness between the inner and outer active material layers.

2. The jelly-roll according to claim 1, wherein the loading amount of the active material for the inner active material layer is within the range of 40 to 95% of that of the active material for the outer active material layer.

3. The jelly-roll according to claim 2, wherein the loading amount of the active material for the inner active material layer is within the range of 50 to 80% of that of the active material for the outer active material layer.

4. The jelly-roll according to claim 1, wherein the loading amount of the active material for the inner active material layer increases from the central region of the sheet current collector to the outermost region of the sheet current collector such that the loading amount of the active material for the inner active material layer at an inner end of the sheet current collector is 30 to 80% of that of the active material for the inner active material layer at an outer end of the sheet current collector.

5. The jelly-roll according to claim 4, wherein the loading amount of the active material for the inner active material layer increases from the central region of the sheet current collector to the outermost region of the sheet current collector such that the loading amount of the active material for the inner active material layer at the inner end of the sheet current collector is 40 to 75% of that of the active material for the inner active material layer at the outer end of the sheet current collector.

6. The jelly-roll according to claim 1, wherein the jelly-roll is wound in a cylindrical shape, and is then compressed in a prismatic shape.

7. A secondary battery including a jelly-roll according to claim 1.

8. The secondary battery according to claim 7, wherein the secondary battery is constructed in a structure in which the jelly-roll is mounted in a prismatic battery case.

* * * * *